United States Patent
Yi et al.

(10) Patent No.: US 10,958,524 B2
(45) Date of Patent: Mar. 23, 2021

(54) METHOD FOR GENERATING NETWORK SLICE TEMPLATE AND FOR APPLYING NETWORK SLICE TEMPLATE, AND APPARATUS

(71) Applicant: DATANG MOBILE COMMUNICATIONS EQUIPMENT CO., LTD, Beijing (CN)

(72) Inventors: Jingfeng Yi, Beijing (CN); Guoxiang Cheng, Beijing (CN); Xianduo Zeng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/496,410

(22) PCT Filed: Mar. 20, 2018

(86) PCT No.: PCT/CN2018/079659
§ 371 (c)(1),
(2) Date: Sep. 20, 2019

(87) PCT Pub. No.: WO2018/171587
PCT Pub. Date: Sep. 27, 2018

(65) Prior Publication Data
US 2020/0382374 A1    Dec. 3, 2020

(30) Foreign Application Priority Data

Mar. 22, 2017 (CN) .......................... 201710175707.X

(51) Int. Cl.
*H04L 12/24* (2006.01)

(52) U.S. Cl.
CPC ...... *H04L 41/0893* (2013.01); *H04L 41/5048* (2013.01); *H04L 41/5051* (2013.01)

(58) Field of Classification Search
None
See application file for complete search history.

(56) References Cited

U.S. PATENT DOCUMENTS 9,762,451 B2 * 9/2017 Liu ..................... H04L 41/5041
9,825,817 B2 * 11/2017 Liu ..................... H04L 41/5048
(Continued)

FOREIGN PATENT DOCUMENTS

| CN | 101876895 A | 11/2010 |
|---|---|---|
| CN | 103226493 A | 7/2013 |
| CN | 105847035 A | 8/2016 |

OTHER PUBLICATIONS

The International Search Report and Written Opinion of the International Searching Authority for PCT Application No. PCT/CN2018/079659 dated Jun. 13, 2018, 16 pages, (English translation).

*Primary Examiner* — Ranodhi Serrao
(74) *Attorney, Agent, or Firm* — Womble Bond Dickinson (US) LLP

(57) ABSTRACT

A method for generating a network slice template and for applying the network slice template, and an apparatus. The method comprises: according to a service characteristic of a service requested by a user, matching in a pre-set slice template database to find whether there is a slice template that satisfies the service characteristic; if so, determining the slice template that satisfies the service characteristic as a target slice template; and if not, generating a target slice template based on the service characteristic, a pre-set slice template, a virtual network function and a network function virtualisation infrastructure database.

18 Claims, 4 Drawing Sheets

(56) References Cited

U.S. PATENT DOCUMENTS

| | | | |
|---|---|---|---|
| 10,129,108 B2* | 11/2018 | Vrzic | H04W 28/0289 |
| 10,284,495 B2* | 5/2019 | Shimojou | H04L 47/82 |
| 10,298,466 B2* | 5/2019 | Li | H04L 41/12 |
| 10,644,955 B2* | 5/2020 | Zhang | H04L 41/12 |
| 10,791,040 B2* | 9/2020 | Vrzic | H04L 47/2408 |
| 2014/0123142 A1 | 5/2014 | Huh et al. | |
| 2015/0121368 A1 | 4/2015 | Beisiegel et al. | |

* cited by examiner

METHOD FOR GENERATING NETWORK SLICE TEMPLATE AND FOR APPLYING NETWORK SLICE TEMPLATE, AND APPARATUS

CROSS REFERENCE TO RELATED APPLICATIONS

This patent application is a U.S. National Phase application under 35 U.S.C. § 371 of International Application No. PCT/CN2018/079659, filed on 20 Mar. 2018, entitled METHOD FOR GENERATING NETWORK SLICE TEMPLATE AND FOR APPLYING NETWORK SLICE TEMPLATE, AND APPARATUS, which claims the priority of Chinese Patent Application No. 201710175707.X, filed with the Chinese Patent Office on Mar. 22, 2017, and entitled "A method and device for generating, a network slice template, and a method and device for applying a network slice template", which was incorporated by reference in its entirety.

FIELD

The present disclosure relates to the field of wireless communications, and particularly to a method and device for generating a network slice template, and a method and device for applying a network slice template.

BACKGROUND

As the applications of the wireless communication technologies are advancing rapidly, the $5^{th}$-Generation (5G) mobile communication networks have emerged accordingly, and they are advantageous in high reliability, a short delay, extensive application scenarios, etc.

As the network technologies are being applied more and more widely in reality, they are applied in various scenarios, and network function elements are also deployed differently as required in the different application scenarios. For example, in an enhanced mobile broadband scenario in which a mobile terminal is provided with continuous coverage, the control plane is deployed centrally, and service-plane function elements are deployed in a core area or network elements as needed; in a low-delay and high-reliability scenario of the Internet of Vehicles, industry control, and other Internet of Things applications, control-plane function elements and service-plane function elements are deployed in a core area; and in a low-power-consumption and massive-machine scenario in which sensors acquire data for environment supervision, intelligent agriculture, etc., the control plane and the service plane are deployed at the edge of a network.

In order to enable a network to be applicable in various application scenarios, and to satisfy a variety of demands in various vertical industries, the network slice technologies have emerged accordingly. A network slice is a set of network functions, resources for performing the network functions, and a configuration specific to the network function, and the network functions and their corresponding configuration constitute an integral logic network including network features required to satisfy a specific service.

In the existing process forming a network slice, a network slice template is generally generated as follows: 1) requisite network elements are determined by analyzing a service demand; 2) the number of requisite network elements, and their configuration are determined by analyzing a capacity demand; 3) a network topology and an interface configuration are determined by analyzing connection and delay demands; and 4) the number of spare network elements, and their configuration are determined by analyzing a high-availability demand, and finally a slice template file is generated and further input into an orchestration and management system so that a network slice is deployed. This process of generating a network slice template is so troublesome that there is a considerable workload, and the network slice template may be generated inefficiently in a long cycle.

SUMMARY

In view of the problems above, embodiments of the disclosure provide a method and device for generating a network slice template, and a method and device for applying a network slice template so as to overcome or at least partially address these problems.

In a first aspect, an embodiment of the disclosure discloses a method for generating a network slice template, the method including:

matching in a preset slice template database according to a service characteristic requested by a user to find whether there is a slice template satisfying the service characteristic; if there is a slice template satisfying the service characteristic requested by a user, determining the slice template satisfying the service characteristic as a target slice template; and otherwise, generating a target slice template based upon the service characteristic, a preset slice template database, a preset virtual network function database, and a preset network function virtualization infrastructure database.

Optionally, matching in a preset slice template database according to a service characteristic requested by a user to find whether there is a slice template satisfying the service characteristic includes: parsing slice templates in the slice template database to determine a characteristic of a virtual network function of each of the slice templates; matching the characteristics of the virtual network functions of the slice templates with the service characteristic; and if a characteristic of the virtual network function of one of the slice templates match with the service characteristics, determining that there is a slice template satisfies the service characteristics.

Optionally, the service characteristic, and the characteristic of the virtual network function include a service type, a service capacity, a service interface and a quantity of connection, and a service high-availability cluster demand respectively, and determining that the characteristics of the virtual network function of the slice template match with the service characteristics includes:

matching the service type of the virtual network function with the service type included in the service characteristic, matching the service capacity of the virtual network function with the service capacity included in the service characteristic, matching a service interface and a quantity of connection of the virtual network function with a service interface and a quantity of connection included in the service characteristics\, and matching the service high-availability cluster demand of the virtual network function with the service high-availability cluster demand included in the service characteristics; and determining that the characteristics of the virtual network function of the slice template match with the service characteristic when the service type of the virtual network function matches with the service type included in the service characteristic, the service capacity of the virtual network function matches with the service capacity included in the service characteristic, a service interface and a quantity of connection of the virtual network function match with a service interface and a quantity of connection included in the service characteristics, and the service high-availability cluster demand of the virtual network function matches with the service high-availability cluster demand included in the service characteristics.

Optionally, the generating the target slice template based upon the service characteristic, the preset slice template database, the preset virtual network function database, and the preset network function virtualization infrastructure database includes:

matching in the preset virtual network function database according to the service characteristic to find whether there is a virtual network function satisfying with the service characteristic;

if there is the virtual network function satisfying the service characteristic, generating the target slice template according to the virtual network function; and otherwise, matching in the slice template database to find whether there is an optimum slice template according to the service characteristic and the virtual network function database, and if there is the optimum slice template, generating the target slice template based upon the optimum slice template; otherwise, generating a virtual network function satisfying the service characteristic, and generating the target slice template according to the virtual network function.

Optionally, the service characteristic, and the characteristic of the virtual network function include a service type, a service capacity, a service interface and a quantity of connection, and a service high-availability cluster demand respectively, and the matching in the preset virtual network function database according to the service characteristic to find whether there is a virtual network function satisfying the service characteristic includes:

matching the service type of each of the virtual network functions in the preset virtual network function database with the service type included in the service characteristic, matching the service capacity of each of the virtual network functions in the preset virtual network function database with the service capacity included in the service characteristic, matching a service interface and a quantity of connection of each of the virtual network functions in the preset virtual network function database with a service interface and a quantity of connection included in the service characteristic, and matching the service high-availability cluster demand of each of the virtual network functions in the preset virtual network function database with the service high-availability cluster demand included in the service characteristic; and determining that the virtual network function satisfies the service characteristic when the service type of the virtual network function matches with the service type included in the service characteristic, the service capacity of the virtual network function matches with the service capacity included in the service characteristic, a service interface and a quantity of connection of the virtual network function match with a service interface and a quantity of connection included in the service characteristic, and the service high-availability cluster demand of the virtual network function matches with the service high-availability cluster demand included in the service characteristic.

Optionally, the generating the target slice template based upon the optimum slice template includes:

presenting the optimum slice template;

reminding the user of editing the optimum slice template;

receiving information about editing of the optimum slice template by the user; and generating the target slice template based upon the optimum slice template and the information about editing.

Optionally, the generating the virtual network function satisfying the service characteristics includes:

presenting network function virtualization infrastructures in the preset network function virtualization infrastructure database to the user;

reminding the user of selecting one of the network function virtualization infrastructures;

receiving the network function virtualization infrastructure selected by the user;

generating the virtual network function satisfying the service characteristics according to the network function virtualization infrastructure selected by the user; and storing generated virtual network function into the virtual network function database.

Optionally, the method further includes: reminding the user of extending an existed network function virtualization infrastructures for satisfying the service characteristic, or generating a network function virtualization infrastructure satisfying the service characteristic; and storing the extended or generated network function virtualization infrastructure into the preset network function virtualization infrastructure database.

In a second aspect, an embodiment of the disclosure discloses a method for applying a network slice template, the method including:

loading a target slice template satisfying service characteristic of a service requested by a user according to the service characteristic;

receiving an instruction for deploying the target slice template; and deploying the target slice template according to the instruction;

wherein the target slice template is generated by:

matching in a preset slice template database according to a service characteristic requested by a user to find whether there is a slice template satisfying the service characteristic;

if there is a slice template satisfying the service characteristic requested by a user, determining the slice template satisfying the service characteristic as a target slice template; and otherwise, generating a target slice template based upon the service characteristic, a preset slice template database, a preset virtual network function database, and a preset network function virtualization infrastructure database.

Optionally, the method further includes: if the target slice template is deployed successfully, displaying a state of a virtual network function of the target slice template to the user.

In a third aspect, an embodiment of the disclosure discloses a device for generating a network slice template, the device including:

a slice template matching module configured to match in a preset slice template database according to a service characteristic requested by a user to find whether there is a slice template satisfying the service characteristic;

a target slice template determining module configured, if there is a slice template satisfying the service characteristic requested by a user, to determine the slice template satisfying the service characteristic as a target slice template; and a target slice template generating module configured, if there is no slice template satisfying the service characteristic, to generate a target slice template based upon the service characteristic, a preset slice template database, a preset virtual network function database, and a preset network function virtualization infrastructure database.

Optionally, the slice template matching module includes:

a characteristic determining sub-module configured to parse slice templates in the slice template database to determine characteristics of virtual network functions of each of the slice templates;

a first characteristic matching sub-module configured to match the characteristics of the virtual network functions of each of the slice templates with the service characteristic; and a determining sub-module configured, if the characteristics of the virtual network function of one of the slice templates match with the service characteristic, to determine that there is a slice template satisfying the service characteristic.

Optionally, the service characteristic, and the characteristic of the virtual network functions respectively include a service type, a service capacity, a service interface and a quantity of connection, and a service high-availability cluster demand; and the first characteristic matching sub-module includes:

a first characteristic matching unit configured to match the service type of the virtual network function with the service type included in the service characteristic, to match the service capacity of the virtual network function with the service capacity included in the service characteristic, to match a service interface and a quantity of connection of the virtual network function with a service interface and a quantity of connection included in the service characteristic, and to match the service high-availability cluster demand of the virtual network function with the service high-availability cluster demand included in the service characteristic; and a first characteristic match determining unit configured to determine that the characteristic of the virtual network function of the slice template match with the service characteristic when the service type of the virtual network function matches with the service type included in the service characteristic, the service capacity of the virtual network function matches with the service capacity included in the service characteristic, a service interface and a quantity of connection of the virtual network function match with a service interface and a quantity of connection included in the service characteristic, and the service high-availability cluster demand of the virtual network function matches with the service high-availability cluster demand included in the service characteristic.

Optionally, the target slice template generating module includes:

a second characteristic matching sub-module configured to match in the preset virtual network function database according to the service characteristic to find whether there is a virtual network function satisfying the service characteristic;

a first target slice template creating sub-module configured, if there is a virtual network function satisfying the service characteristic, to generate the target slice template according to the virtual network function; and an optimum slice template matching sub-module configured, if there is no virtual network function satisfying the service characteristic, to match in the slice template database according to the service characteristic and the virtual network function database to find whether there is an optimum slice template;

a second target slice template generating sub-module configured, if there is an optimum slice template, to generate the target slice template based upon the optimum slice template; and a virtual network function generating sub-module configured, if there is no optimum slice template, to generate a virtual network function satisfying the service characteristic, and to generate the target slice template according to the virtual network function.

Optionally, the service characteristics, and the characteristic of the virtual network functions include a service type, a service capacity, a service interface and a quantity of connection, and a service high-availability cluster demand respectively; and the second characteristic matching sub-module includes:

a second characteristic matching unit is configured to match the service type of each virtual network function in the preset virtual network function database with the service type included in the service characteristic, to match the service capacity of the virtual network function in the preset virtual network function database with the service capacity included in the service characteristic, to match a service interface and a quantity of connection of the virtual network function in the preset virtual network function database with a service interface and a quantity of connection included in the service characteristic, and to match the service high-availability cluster demand of the virtual network function in the preset virtual network function database with the service high-availability cluster demand included in the service characteristic; and a determining unit configured to determine that the characteristic of the virtual network function match with the service characteristic when the service type of the virtual network function matches with the service type included in the service characteristic, the service capacity of the virtual network function matches with the service capacity included in the service characteristic, a service interface and a quantity of connection of the virtual network function match with a service interface and a quantity of connection included in the service characteristic, and the service high-availability cluster demand of the virtual network function matches with the service high-availability cluster demand included in the service characteristic.

Optionally, the second target slice template generating sub-module includes:

a first presenting unit configured to present the optimum slice template;

a first reminding unit configured to remind the user of editing the optimum slice template;

a first receiving unit configured to receive information about editing of the optimum slice template by the user; and a first target slice template generating unit configured to generate the target slice template based upon the optimum slice template and the information about editing.

Optionally, the virtual network function generating sub-module includes:

a second presenting unit configured to present network function virtualization infrastructures in the preset network function virtualization infrastructure database to the user;

a first reminding unit configured to remind the user of selecting one of the network function virtualization infrastructures;

a first receiving unit configured to receive the network function virtualization infrastructure selected by the user;

a virtual network function generating unit configured to generate the virtual network function satisfying the service characteristic according to the network function virtualization infrastructure selected by the user; and a virtual network function storing unit configured to store generated virtual network function into the virtual network function database.

Optionally, when the network function virtualization infrastructures based on which virtual network function satisfying the service characteristic cannot be generated, are presented to the user, the virtual network function generating sub-module further includes:

a network function virtualization infrastructure generating unit configured to remind the user of extending an existed network function virtualization infrastructure for satisfying the service characteristic, or generating a network function virtualization infrastructure satisfying the service characteristic;

a network function virtualization infrastructure storing unit configured to store the extended or generated network function virtualization infrastructure into the preset network function virtualization infrastructure database.

In a fourth aspect, an embodiment of the disclosure discloses a device for applying a network slice template, the device including:

a target slice template loading module configured to load a target slice template satisfying service characteristic of a service requested by a user according to the service characteristic;

an instruction receiving module configured to receive an instruction for deploying the target slice template; and a deploying module configured to deploy the target slice template according to the instruction;

wherein the target slice template is generated by:

matching in a preset slice template database according to a service characteristic requested by a user to find whether there is a slice template satisfying the service characteristic;

if there is a slice template satisfying the service characteristic requested by a user, determining the slice template satisfying the service characteristic as a target slice template; and otherwise, generating a target slice template based upon the service characteristic, a preset slice template database, a preset virtual network function database, and a preset network function virtualization infrastructure database.

Optionally, the device further includes:

a displaying module configured, if the target slice template is deployed successfully, to display a state of a virtual network function of the target slice template to the user.

In a fifth aspect, an embodiment of the disclosure discloses a computer device including a processor and a memory, wherein the processor is configured to read and execute program in a memory to perform the method according to any one of the embodiments in the first aspect above.

In a sixth aspect, an embodiment of the disclosure discloses a computer device including a processor and a memory, wherein the processor is configured to read and execute program in a memory to perform the method according to any one of the embodiments in the second aspect above.

In a seventh aspect, an embodiment of the disclosure discloses a computer readable storage medium storing executable program codes configured to perform the method according to any one of the embodiments in the first aspect above.

In an eighth aspect, an embodiment of the disclosure discloses a computer readable storage medium storing executable program codes configured to perform the method according to any one of the embodiments in the second aspect above.

In the embodiments of the disclosure, a satisfying slice template in a preset slice template database is matched with service characteristic of a service requested by a user according to the service characteristic, and if the slice template satisfying the service characteristic exists, the slice template satisfying the service characteristic will be determined as a target slice template; otherwise, a target slice template will be generated based upon the service characteristic, the preset slice template database, a preset virtual network function database, and a preset network function virtualization infrastructure database. In an application of the embodiment of the disclosure, a satisfying slice template in the preset slice template database is matched with the service characteristic according to the service characteristic, or a target slice template is generated based upon the slice template database, the preset virtual network function database, and the preset network function virtualization infrastructure database, but the user may be skilled in a number of services, thus simplifying an operating process, lowering a workload, shortening a cycle of generating a network slice template, and improving the efficiency of generating the network slice template.

BRIEF DESCRIPTION OF THE DRAWINGS

In order to make the technical solutions according to the embodiments of the disclosure more apparent, the drawings to which reference is to be made in the description of the embodiments will be introduced below in brevity, and apparently the embodiments to be described below are only some embodiments of the disclosure. Those ordinarily skilled in the art can further derive the other drawings from these drawings without any inventive effort.

DETAILED DESCRIPTION OF THE EMBODIMENTS

The technical solutions according to the embodiments of the disclosure will be described below clearly and fully with reference to the drawings in the embodiments of the disclosure, and apparently the embodiments to be described below are only a part but not all of the embodiments of the disclosure. Based upon the embodiments here of the disclosure, all the other embodiments which can occur to those ordinarily skilled in the art without any inventive effort shall fall into the scope of the disclosure.

Figure 1:
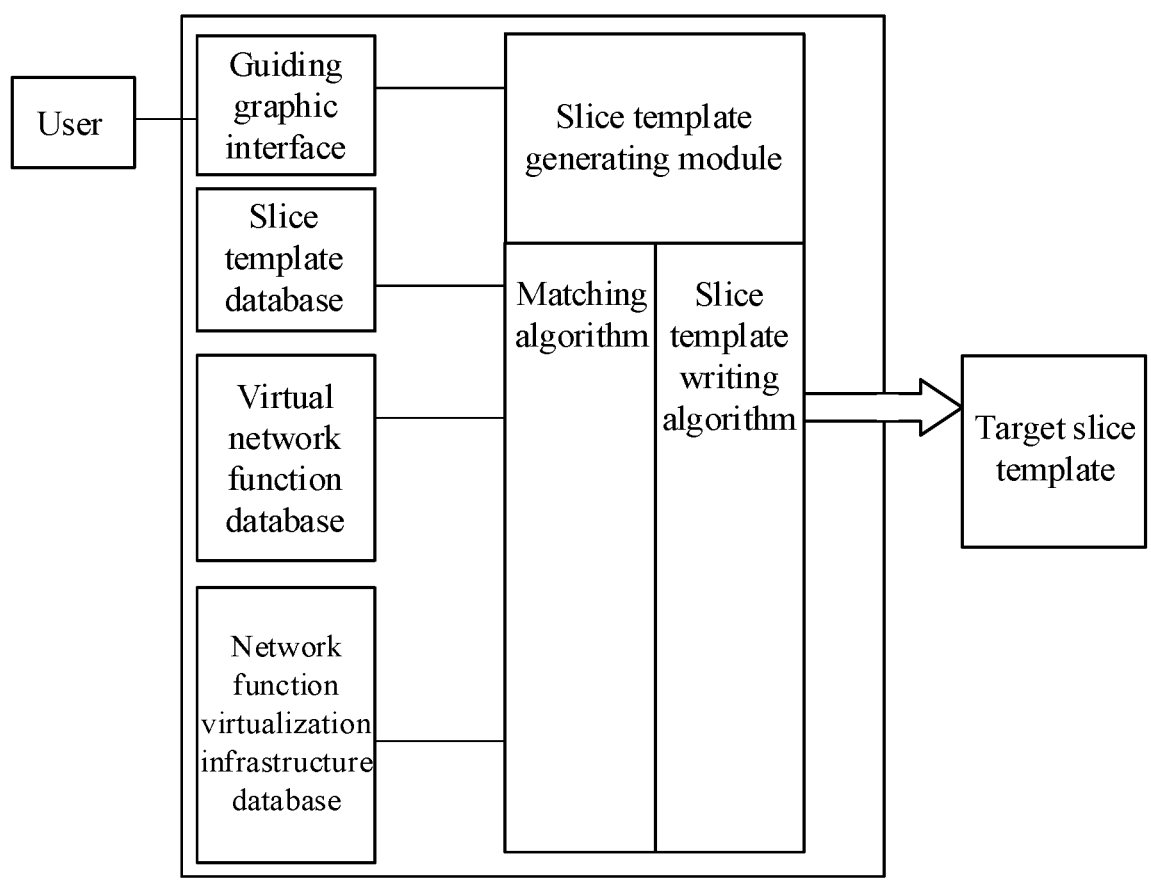
FIG. 1 is a schematic principle diagram of a method for generating a network slice template according to an embodiment of the disclosure.

In order to simplify a process of generating a network slice template, the process of generating a network slice template is presented via a guiding graphic interface in the embodiments of the disclosure as illustrated in FIG. 1.

In the embodiments of the disclosure, the following databases are preset:

a slice template database for storing slice templates;

a virtual network function database for storing virtual network functions required for supporting the slice plates in the slice template database; and a network function virtualization infrastructure resource database for storing resources for supporting the virtual network functions.

Furthermore, a guiding graphic interface is further provided in the embodiments of the disclosure. A user can request for service characteristics of a service via the guiding graphic interface.

Furthermore, a slice generating module including a matching algorithm is further provided in the embodiments of the disclosure, where the matching algorithm is configured to match a satisfying target slice template in the slice template database with the service characteristics of the service requested by the user via the guiding graphic interface.

Furthermore the slice generating module further includes a slice module writing module configured to generate the target slice template based upon the service characteristics, the slice template database, the virtual network function database, and the preset network function virtualization infrastructure resource database.

Figure 2:
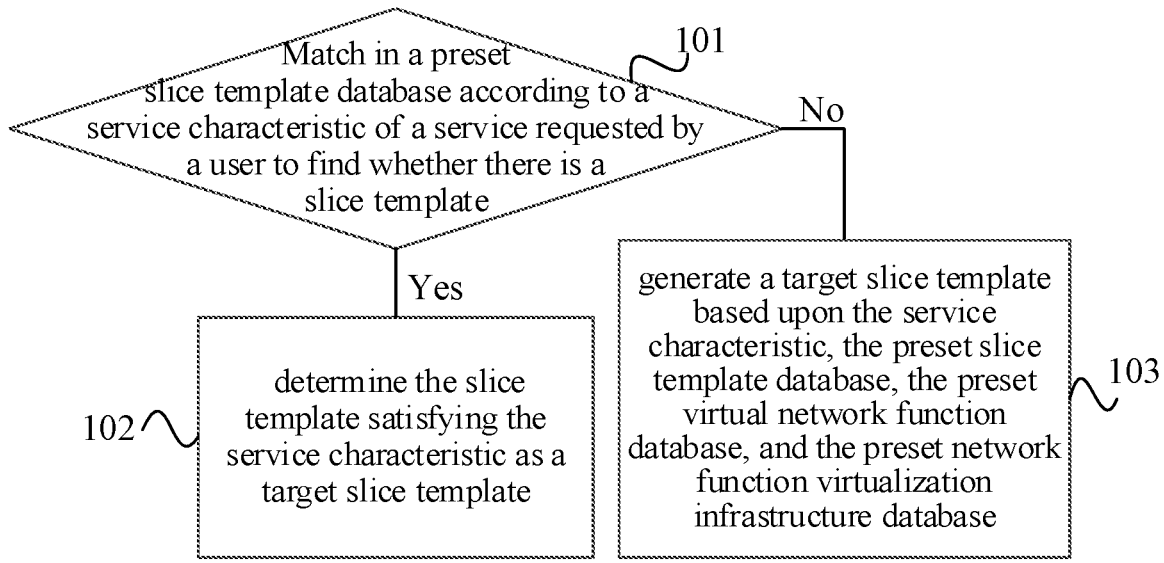
FIG. 2 is a flow chart of steps in a method for generating a network slice template according to an embodiment of the disclosure.

FIG. 2 illustrates a flow chart of steps in a method for generating a network slice template according to an embodiment of the disclosure. The flow can be performed by a device for generating a network slice template, and a principle of the device can be as illustrated in FIG. 1.

As illustrated in FIG. 2, the method particularly can include the following steps.

The step 101 is to match in a preset slice template database according to a service characteristic requested by a user to find whether there is a slice template satisfying the service characteristic of a service requested by a user, and if the slice template satisfying the service characteristics exists, then to proceed to the step 102; otherwise, proceed to the step 103.

In the embodiment of the disclosure, a process of generating a slice template can be presented via a guiding graphic interface. For example, for a service to go online for the user, characteristics of the service can be input to the guiding graphic interface to generate a corresponding slice template. Particularly the step 101 can include the following sub-steps.

The sub-step 1011 is to parse respective slice templates in the slice template database to obtain characteristics of virtual network functions of the respective slice templates.

In a real application, the slice template database in which slice templates satisfying different scenario demands can be set. For example, various slice templates in an enhanced mobile broadband scenario, a massive-machine Internet of Things scenario, and a short-delay and high-reliability scenario are stored. Upon the reception of the service request of the user, the slice template in the slice template database can be parsed to obtain the characteristics of the virtual network functions corresponding to the slice templates. Particularly, the slice templates are parsed to obtain descriptive information of the slice plates, where the descriptive information includes the characteristics of the virtual network functions corresponding to the slice templates.

The step 1012 is to match the characteristics of the virtual network functions of the respective slice templates with the service characteristics.

In the embodiment of the disclosure, the service characteristics, and the characteristics of the virtual network functions include a service type, a service capacity, a service interface and a quantity of connection, and a service high-availability cluster demand, so the sub-step 1012 includes the following sub-steps:

the sub-step 1012-1 is to match the service types, the service capacities, a service interface and a quantity of connection, and the service high-availability cluster demands of the virtual network functions respectively with the service type, the service capacity, a service interface and a quantity of connection, and the service high-availability cluster demand included in the service characteristics; and the step 1012-2 is to determine that the characteristics of the virtual network function of one of the slice templates match with the service characteristics when the service type of the virtual network function matches with the service type included in the service characteristics, the service capacity of the virtual network function matches with the service capacity included in the service characteristics, a service interface and a quantity of connection of the virtual network function match with a service interface and a quantity of connection included in the service characteristics, and the service high-availability cluster demand of the virtual network function matches with the service high-availability cluster demand included in the service characteristics.

In a real application, upon reception of the service type, the service capacity, a service interface and a quantity of connection, and the service high-availability cluster demand of the service requested by the user via the guiding graphic interface, the virtual network function corresponding to one of the slice templates is found in the virtual network function database, the characteristics of the virtual network function corresponding to the slice template are matched with the service characteristics, and when the service type, the service capacity, a service interface and a quantity of connection, and the service high-availability cluster demand of the virtual network function corresponding to the slice template match with the service characteristics, it indicates that the slice template supported by the virtual network function satisfies the service characteristics, so the flow proceeds to the sub-step 1013; otherwise, the flow proceeds to the step 103.

The sub-step 1013 is to determine that the slice template satisfying the service characteristics exists when the characteristics of the virtual network function of the slice template match with the service characteristics.

In the embodiment of the disclosure, the slice template in the slice template database shall be supported by the virtual network function in the virtual network function database, and when the characteristics of the virtual network functions satisfy the service characteristics, the slice template supported by the virtual network function is determined as a slice template satisfying the service characteristics. Of course, the descriptive information of the slice template can alternatively include the service type, the service capacity, a service interface and a quantity of connection, and the service high-availability cluster demand of the slice template directly, and at this time, the descriptive information can be matched directly with the service characteristics, and if they are matched successfully, then it will be determined that the slice template satisfying the service characteristics exists.

The step 102 is to determine the slice template satisfying the service characteristics as a target slice template.

When it is determined the slice template satisfying the service characteristics in the preset slice template database exists, the slice template can be determined as is a target slice template of the service requested by the user, and a slice template file can be obtained directly, so that the user can obtain the slice template satisfying the service characteristics from the preset slice template database according to the service characteristics of the requested service simply by inputting the service characteristics via the guiding graphic interface, but it is not necessary for the user to be skilled in a number of services, thus simplifying an operating process, and improving the efficiency of generating a slice template.

The step 103 is to generate a target slice template based upon the service characteristics, the preset slice template database, the preset virtual network function database, and the preset network function virtualization infrastructure database.

In the embodiment of the disclosure, the step 103 includes the following sub-steps:

the sub-step 1031 is to match a satisfying virtual network function in the preset virtual network function database with the service characteristics, and if the virtual network function satisfying the service characteristics exists, then to proceed to the step 1032; otherwise, proceed to the step 1033.

In the embodiment of the disclosure, a satisfying virtual network function in the preset virtual network function database can be matched with the service characteristics to determine one virtual network function satisfying the service characteristics, or a combination of virtual network functions satisfying the service characteristics of the service requested by the user, and particularly the sub-step 1031 includes the following sub-steps:

the sub-step 1031-1 is to match the service types, the service capacities, a service interface and a quantity of connection, and the service high-availability cluster demands of the respective virtual network functions in the preset virtual network function database respectively with the service characteristics; and the step 1031-2 is to determine that one of the virtual network functions satisfies the service characteristics when the service type of the virtual network function matches with the service type included in the service characteristics, the service capacity of the virtual network function matches with the service capacity included in the service characteristics, a service interface and a quantity of connection of the virtual network function match with a service interface and a quantity of connection included in the service characteristics, and the service high-availability cluster demand of the virtual network function matches with the service high-availability cluster demand included in the service characteristics.

In a real application, firstly satisfying virtual network functions in the virtual network function database are matched with the service type included in the service characteristics; secondly satisfying virtual network functions in the virtual network function database are matched with the capacity demand of the service according to calculated capacities of the respective virtual network functions, and the number of those virtual network functions is determined; thereafter satisfying virtual network functions in the virtual network function database are matched with a service interface and a quantity of connection according to the demand for the number of service connections, the numbers of connections supported by the respective virtual network functions in the virtual network function database, and interface resources in the network function virtualization infrastructure resource database, and interface configurations of those virtual network functions are determined; and finally redundant virtual network functions are matched with the service high-availability cluster demand, e.g., one virtual network function plus one spare virtual network function, or one virtual network function plus N virtual network functions.

It shall be noted that in the embodiment of the disclosure, a satisfying virtual network function can be matched in the preset virtual network function database with the service characteristics to determine one virtual network function, or a combination of virtual network functions. For example, no existing virtual network function can satisfy the service characteristics, but a combination of virtual network functions may satisfy the service characteristics, where there is no slice template in the slice template database corresponding to the virtual network function or the combination of virtual network functions satisfying the service characteristics.

The sub-step 1032 is to generate the target slice template using the virtual network function if the virtual network function satisfying the service characteristics exists.

In the embodiment of the disclosure, the virtual network function or the combination of virtual network functions matched in the sub-step 1031 can be presented to the user via the guiding graphic interface, and after the virtual network function or the combination of virtual network functions is confirmed by the user, the virtual network function or the combination of virtual network functions can be input to a slice template generating algorithm to generate the target slice template.

In the embodiment of the disclosure, when it is determined that there is no slice template satisfying the service characteristics in the preset slice template database, the virtual network function or the combination of virtual network functions in the virtual network function database satisfying the service characteristics can be presented to the user via the guiding graphic interface, and upon reception of confirmation information of the user, the slice template satisfying the service characteristics can be generated although the user may not be skilled in a number of services, thus simplifying an operating process, and improving the efficiency of generating a slice template.

The sub-step 1033 is, if there is no virtual network function satisfying the service characteristics, to match an optimum slice template in the slice template database with the service characteristics according to the virtual network function database, and if the optimum slice template exists, to proceed to the sub-step 1034; otherwise, to proceed to the sub-step 1035.

In a real application, when neither satisfying slice template nor satisfying virtual network function is matched with the service characteristics, an optimum slice template can be matched preferentially with service performance, and new characteristics can be added to the optimum slice template to generate a slice template satisfying the service characteristics.

The sub-step 1034 is to generate the target slice template based upon the optimum slice template when the optimum slice template exists.

In the embodiment of the disclosure, the sub-step 1034 includes the following sub-steps:

the sub-step 1034-1 is to present the optimum slice template;

the sub-step 1034-2 is to remind the user of editing the optimum slice template;

the sub-step 1034-3 is to receive information about editing of the optimum slice template by the user; and the sub-step 1034-4 is to generate the target slice template based upon the optimum slice template and the information about editing.

In this embodiment, when there is no combination of virtual network functions matched in the virtual network function database with the service characteristics, after the optimal slice template is matched preferentially with the service characteristics, the optimal slice template is presented to the user to remind the user of editing the optimal slice template, for example, adding characteristics to the optimal slice template, to thereby generate a slice template satisfying the service characteristics; and for example, the performance of the optimal slice template is matched, but a scaled capacity threshold thereof is not matched, so the user is reminded of modifying the setting, via the guiding graphic interface, and upon reception of modification information of the user, the target slice template satisfying the service characteristics is generated in the slice template generating algorithm.

The optimum slice template is presented to the user via the guiding graphic interface, and the user is reminded of adding new characteristics to the optimum slice template to generate the target slice template satisfying the service characteristics, so the user can simply add the corresponding characteristics satisfying the service characteristics to the optimum slice template without being skilled in a number of services, thus simplifying an operating process, shortening a cycle of generating a slice template, and improving the efficiency of generating the slice template.

The sub-step 1035 is, if there is no optimum slice template, to generate a virtual network function satisfying the service characteristics, and to return to the step of generating the target slice template according to the virtual network function.

In the embodiment of the disclosure, when there is neither optimum slice template satisfying the service characteristics in the preset slice template database, nor a combination of virtual network functions satisfying the service characteristics in the preset virtual network function database, a virtual network function satisfying the service characteristics is generated, and particularly the sub-step 1035 includes the following sub-steps:

the sub-step 1035-1 is to present network function virtualization infrastructures in the preset network function virtualization infrastructure database to the user;
the sub-step 1035-2 is to remind the user of selecting one of the network function virtualization infrastructures;
the sub-step 1035-3 is to receive the network function virtualization infrastructure selected by the user;
the sub-step 1035-4 is to generate the virtual network function satisfying the service characteristics according to the network function virtualization infrastructure selected by the user; and
the sub-step 1035-5 is to store the virtual network function into the virtual network function database.

When there is neither optimum slice template nor virtual network function satisfying the service characteristics, the network function virtualization infrastructures are presented to the user via the guiding graphic interface, the user is reminded of selecting one of the network function virtualization infrastructures to select corresponding resources for generating the virtual network function satisfying the service characteristics, a description of the virtual network function is made and stored into the virtual network function database, and after the virtual network function satisfying the service characteristics is generated, the flow can proceed to the step 1032 of generating the template slice template.

In the embodiment of the disclosure, the resources in the network function virtualization infrastructure database may not satisfy the demand of the user for generating a virtual network function, so the sub-step 1035 can further include the following sub-steps:

the sub-step 1035-6 is to remind the user of extending one of the existing network function virtualization infrastructures, or generating a network function virtualization infrastructure satisfying the service characteristics;
the sub-step 1035-7 is to store the network function virtualization infrastructure into the preset network function virtualization infrastructure database.

When none of the network function virtualization infrastructures presented to the user in the sub-step 1035-1 can satisfy the demand of the user for generating a virtual network function satisfying the service characteristics, the user can be reminded of extending one of the existing network function virtualization infrastructure resources, or generating new network function virtualization infrastructure resources, and then the generated new network function virtualization infrastructure can be stored into the network function virtualization infrastructure resource database to thereby enrich the network function virtualization infrastructure resource database so as to improve the applicability thereof.

In the embodiment of the disclosure, optionally after the target slice template is generated, the method further includes: storing the generated target slice template into the preset slice template database.

The generated target slice template includes one of the target slice template generated using the virtual network function, and the target slice template generated using the optimum slice template, and the information obtained via the guiding graphic interface, and the generated target slice template is stored into the slice template database so that the slice templates satisfying a variety of service characteristic request in various scenarios can be accumulated to thereby enrich the slice template database so as to improve the applicability thereof.

In the embodiment of the disclosure, a satisfying slice template in a preset slice template database is matched with service characteristics of a service requested by a user according to the service characteristics, and if the slice template satisfying the service characteristics exists, then the slice template satisfying the service characteristics exists will be determined as a target slice template; otherwise, a target slice template will be generated based upon the service characteristics, the preset slice template database, a preset virtual network function database, and a preset network function virtualization infrastructure database. In an application of the embodiment of the disclosure, a satisfying slice template in the preset slice template database is matched with the service characteristics according to the service characteristics, or a target slice template is generated based upon the slice template database, the preset virtual network function database, and the preset network function virtualization infrastructure database, but the user may be skilled in a number of services, thus simplifying an operating process, lowering a workload, shortening a cycle of generating a network slice template, and improving the efficiency of generating the network slice template.

In the embodiment of the disclosure, the target slice template can be generated based upon the service characteristics, the preset slice template database, the preset virtual network function database, and the preset network function virtualization infrastructure database by storing the generated slice template, network virtual function, and network function virtualization infrastructure respectively into the slice template, the virtual network function database, and the preset network function virtualization infrastructure database to thereby further enrich the respective databases so as to improve the applicability thereof, and to enhance the efficiency and the easiness-to-use of automated intelligent management and orchestration.

In the embodiment of the disclosure, the user can generate the slice template, the virtual network function database, and the preset network function virtualization infrastructure simply by inputting a corresponding demand for the service characteristics in response to a reminder in the guiding graphic interface to thereby generate the target slice template satisfying the service characteristics so as to simplify an operating process, and to lower a workload.

Figure 3:
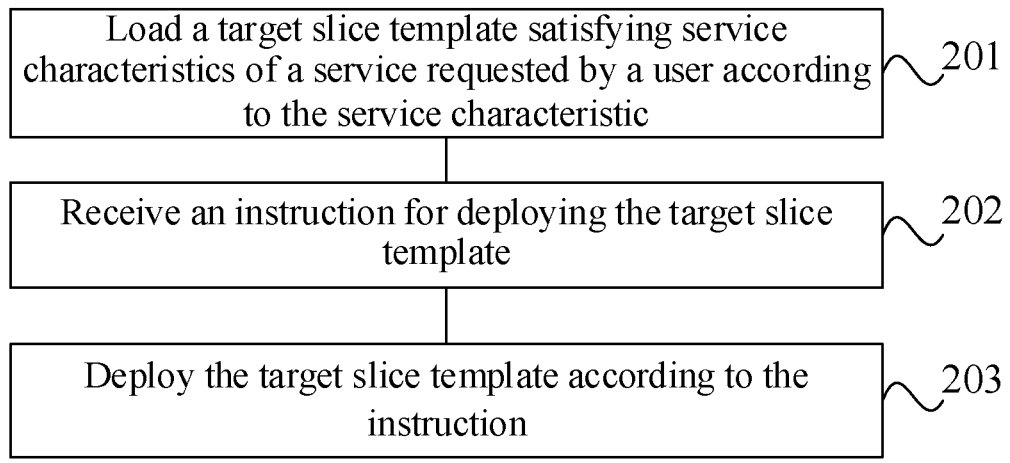
FIG. 3 is a flow chart of steps in a method for applying a network slice template according to an embodiment of the disclosure.

FIG. 3 illustrates a flow chart of steps in a method for applying a network slice template according to an embodiment of the disclosure, where the flow particularly can include the following steps:

the step 201 is to load a target slice template satisfying service characteristics of a service requested by a user according to the service characteristics;

the step 202 is to receive an instruction to deploy the target slice template; and the step 203 is to deploy the target slice template in response to the instruction.

In the embodiment of the disclosure, upon reception of the service request of the user, the target slice template satisfying the service characteristics can be loaded according to the service characteristics, and thereafter the target slice template can be deployed in response to the deployment instruction, where the target slice template is generated as follows: a satisfying slice template in a preset slice template database is matched with service characteristics of a service requested by a user according to the service characteristics, and if the slice template satisfying the service characteristics exists, then the slice template satisfying the service characteristics exists will be determined as a target slice template; otherwise, a target slice template will be generated based upon the service characteristics, the preset slice template database, a preset virtual network function database, and a preset network function virtualization infrastructure database. In the embodiment of the disclosure, the target slice template can be generated as described in details in the embodiment of the method for generating a network slice template, so a repeated description thereof will be omitted here.

In the embodiment of the disclosure, optionally the method further includes: if the target slice template is deployed successfully, then the state of the virtual network function of the target slice template will be displayed to the user. In a real application, the state of the virtual network function of the target slice template can be displayed via a graph interface, e.g., whether respective functions are normal, etc., so that the user can grasp the deployment state of the target slice template in real time.

In the embodiment of the disclosure, a target slice template satisfying service characteristics of a service requested by a user is loaded and deployed according to the service characteristics, and since the target slice template satisfies the service characteristics of the service requested by the user, a satisfying slice template in a preset slice template database is matched with the service characteristics, and if the slice template satisfying the service characteristics exists, then the slice template satisfying the service characteristics will be determined as a target slice template; otherwise, a target slice template will be generated based upon the service characteristics, the preset slice template database, a preset virtual network function database, and a preset network function virtualization infrastructure database.

Apparently a process of generating a target slice template can be simplified, and the target slice template can be generated efficiently, thus simplifying the operations of deploying the service, and improving the efficiency of deploying the service.

In order to make the embodiments of the disclosure more apparent, the method for generating a network slice template, and the method for applying a network slice template according to the embodiments of the disclosure will be described below by way of an example, and particularly the example includes the following steps:

in the step S1, a base station and a cloud resource management and orchestration system are powered on, and operate normally;

in the step S2, a device for generating a network slice template is powered on and connected with the cloud resource management and orchestration system;

in the step S3, the device for generating a network slice template obtains information about available network function virtualization infrastructure resources via an Application Programming Interface (API) provided by the cloud resource management and orchestration system;

in the step S4, the device for generating a network slice template obtains service characteristics of an Enhanced Mobile Broadband (EMBB) Internet service to go online as needed for a user;

in the step S5, the device for generating a network slice template searches descriptive information of respective slice templates in a slice template database, for a matching EMBB slice template according to the service characteristics of the EMBB Internet service, and if the EMBB slice template matching with the service characteristics exists, then the device for generating a network slice template will inquire the user about capacity and bandwidth information of the EMBB Internet service, and further pick out and provide an optimum EMMBB slice template to the user; and if there is no EMBB slice template satisfying the service characteristics of the EMBB service requested by the user, then the device for generating a network slice template will generate a virtual network function for the EMBB service to go line, in a preset algorithm, where the virtual network function includes at least a Mobility Management Entity (MME), a Home Subscriber Server (HSS), a Serving Gate Way (SGW), a Packet Data Network (PDN) Gate Way (PGW), and a Policy and Charging Rule Function (PCRF);

in the step S6, the device for generating a network slice template inquires the user about capacity and bandwidth demands via a guiding graphic interface, and searches a virtual network function database for a satisfying virtual network function matching with the EMBB service characteristic demand of the user, according to the capacity and bandwidth demands input by the user;

in the step S7, if there is no virtual network function satisfying the EMBB service characteristic demand of the user in the virtual network function database, then it will search a network function virtualization infrastructure resource database for SGW mirrored resources, and if the SGW mirrored resources exit, then it will further match a flavor template satisfying the demand of the user, according to preconfigured SGW flavor information and capacities, and for example, an SGW flavor template including a 8G memory and four cores to satisfy 100,000 users is described in the network function virtualization infrastructure resource database, and if the EMBB service requested by the user supports 300,000 users, then three SGW virtual network functions shall be generated, so the device for generating a network slice template generates three virtual network function instances of SGW functions;

in the step S8, the device for generating a network slice template generates a target slice template automatically in a preset template composing algorithm after the virtual network function satisfying the EMBB service characteristics is obtained;

in the step S9, the generated target slice template is loaded on a Management & Orchestration (MANO) client;

in the step S10, the target slice template is started upon reception of an instruction to deploy the target slice template, and if the target slice template is started successfully, then the client will indicate that the states of the respective virtual network functions defined in the target slice template are normal; and in the step S11, after the states of the respective virtual network functions become normal, the entire target slice can operate normally to serve the user.

The embodiments of the disclosure have been described above in the example in which the EMBB Internet service goes on as needed for the user, but the embodiments of the disclosure can also be applicable to other types of services, e.g., an mMTC (Massive machine type communications) service, etc.

Apparently in the example, the user can generate and deploy a slice template satisfying the service characteristics, e.g., a service type, a service capacity, and other demands, automatically by inputting the service characteristics via the guiding graphic interface without being skilled in a number of services, thus simplifying an operating process, lowering a workload of the user, shortening a cycle of generating a slice template, and improving the efficiency of generating and applying the slice template.

Figure 4:
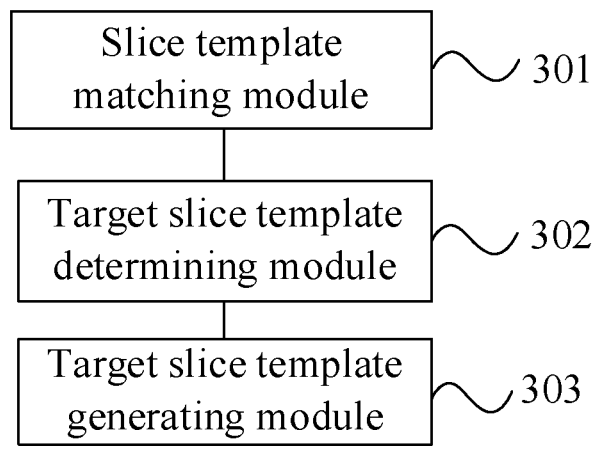
FIG. 4 is a structural block diagram of a device for generating a network slice template according to an embodiment of the disclosure.

FIG. 4 illustrates a structural diagram of a device for generating a network slice template according to an embodiment of the disclosure, where the device for generating a network slice template can perform the method for generating a network slice template according to the embodiment above, and particularly can include the following modules:

a slice template matching module 301 is configured to match in a preset slice template database according to a service characteristic requested by a user to find whether there is a slice template satisfying the service characteristic of a service requested by a user;

a target slice template determining module 302 is configured, if the slice template satisfying the service characteristics exists, to determine the slice template satisfying the service characteristics as a target slice template; and a target slice template generating module 303 is configured, if there is no slice template satisfying the service characteristics, to generate a target slice template based upon the service characteristics, a preset slice template database, a preset virtual network function database, and a preset network function virtualization infrastructure database.

Optionally, the slice template matching module 301 includes:

a characteristic determining sub-module is configured to parse respective slice templates in the slice template database to determine characteristics of virtual network functions of the respective slice templates;

a first characteristic matching sub-module is configured to match a service type of each virtual network function with a service type included in the service characteristics, to match a service capacity of the virtual network function with a service capacity included in the service characteristics, to match a service interface and a quantity of connection of the virtual network function with a service interface and a quantity of connection included in the service characteristics, and to match a service high-availability cluster demand of the virtual network function with a service high-availability cluster demand included in the service characteristics; and a determining sub-module is configured to determine that the characteristics of the virtual network function of the slice template match with the service characteristics when the service type of the virtual network function matches with the service type included in the service characteristics, the service capacity of the virtual network function matches with the service capacity included in the service characteristics, a service interface and a quantity of connection of the virtual network function match with a service interface and a quantity of connection included in the service characteristics, and the service high-availability cluster demand of the virtual network function matches with the service high-availability cluster demand included in the service characteristics.

Optionally, the service characteristics, and the characteristics of the virtual network functions include a service type, a service capacity, a service interface and a quantity of connection, and a service high-availability cluster demand respectively, and the first characteristic matching sub-module includes:

a first characteristic matching unit is configured to match the service type, the service capacity, a service interface and a quantity of connection, and the service high-availability cluster demand of each virtual network function with the service type, the service capacity, a service interface and a quantity of connection, and the service high-availability cluster demand included in the service characteristics; and a first characteristic match determining unit is configured to determine that the characteristics of the virtual network function of the slice template match with the service characteristics when the service type, the service capacity, a service interface and a quantity of connection, and the service high-availability cluster demand of the virtual network function match respectively with the service type, the service capacity, a service interface and a quantity of connection, and the service high-availability cluster demand included in the service characteristics.

Optionally, the target slice template generating module 303 includes:

a second characteristic matching sub-module is configured to match a satisfying virtual network function in the preset virtual network function database with the service characteristics;

a first target slice template generating sub-module is configured, if the virtual network function satisfying the service characteristics exists, to generate the target slice template according to the virtual network function; and an optimum slice template matching sub-module is configured, if there is no virtual network function satisfying the service characteristic, to match an optimum slice template in the slice template database with the service characteristic according to the virtual network function database;

a second target slice template generating sub-module is configured, if the optimum slice template exists, to generate the target slice template based upon the optimum slice template; and a virtual network function generating sub-module is configured, if the optimum slice template does not exist, to generate a virtual network function satisfying the service characteristics, and to generate the target slice template according to the virtual network function.

Optionally, the service characteristics, and the characteristics of the virtual network functions include a service type, a service capacity, a service interface and a quantity of connection, and a service high-availability cluster demand respectively, and the second characteristic matching sub-module includes:

a second characteristic matching unit is configured to match the service type of each virtual network function in the preset virtual network function database with the service type included in the service characteristics, to match the service capacity of the virtual network function in the preset virtual network function database with the service capacity included in the service characteristics, to match a service interface and a quantity of connection of the virtual network function in the preset virtual network function database with a service interface and a quantity of connection included in the service characteristics, and to match the service high-availability cluster demand of the virtual network function in the preset virtual network function database with the service high-availability cluster demand included in the service characteristics; and a determining unit configured to determine that the characteristics of the virtual network function match with the service characteristics when the service type of the virtual network function matches with the service type included in the service characteristics, the service capacity of the virtual network function matches with the service capacity included in the service characteristics, a service interface and a quantity of connection of the virtual network function match with a service interface and a quantity of connection included in the service characteristics, and the service high-availability cluster demand of the virtual network function matches with the service high-availability cluster demand included in the service characteristics.

Optionally, the second target slice template generating sub-module includes:

a first presenting unit is configured to present the optimum slice template;

a first reminding unit is configured to remind the user of editing the optimum slice template;

a first receiving unit is configured to receive information about editing of the optimum slice template by the user; and a first target slice template generating unit is configured to generate the target slice template based upon the optimum slice template and the information about editing.

Optionally, the virtual network function generating sub-module includes:

a second presenting unit is configured to present network function virtualization infrastructures in the preset network function virtualization infrastructure database to the user;

a first reminding unit is configured to remind the user of selecting one of the network function virtualization infrastructures;

a first receiving unit is configured to receive the network function virtualization infrastructure selected by the user;

a virtual network function generating unit is configured to generate the virtual network function satisfying the service characteristics according to the network function virtualization infrastructure selected by the user; and a virtual network function storing unit is configured to store the generated virtual network function into the virtual network function database.

Optionally, in the embodiment of the disclosure, when the network function virtualization infrastructures are presented to the user, but no virtual network function satisfying the service characteristics cannot be generated, the virtual network function generating sub-module further includes:

a network function virtualization infrastructure generating unit is configured to remind the user of extending one of the existing network function virtualization infrastructures, or generating a network function virtualization infrastructure satisfying the service characteristics.

a network function virtualization infrastructure storing unit is configured to store the extended or generated network function virtualization infrastructure into the preset network function virtualization infrastructure database.

Figure 5:
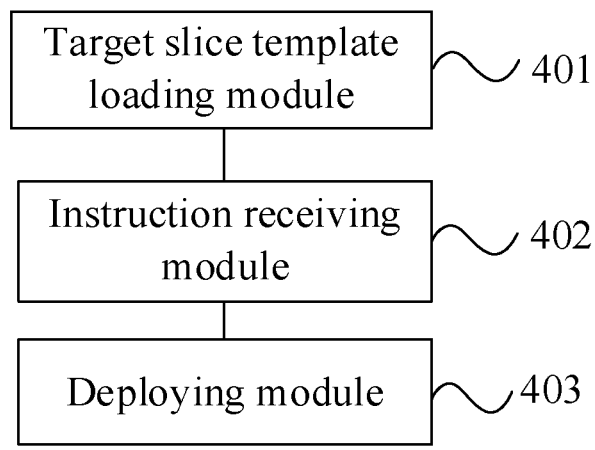
FIG. 5 is a structural block diagram of a device for applying a network slice template according to an embodiment of the disclosure.

FIG. 5 illustrates a structural diagram of a device for applying a network slice template according to an embodiment of the disclosure, where the device for generating a network slice template can perform the method for applying a network slice template according to the embodiment above, and particularly can include the following modules:

a target slice template loading module 401 is configured to load a target slice template satisfying service characteristics of a service requested by a user according to the service characteristics;

an instruction receiving module 402 is configured to receive an instruction to deploy the target slice template; and a deploying module 403 is configured is to deploy the target slice template in response to the instruction.

Where the target slice template is generated by:

matching a satisfying slice template in a preset slice template database with the service characteristics of the service requested by the user according to the service characteristics; and if the slice template satisfying the service characteristics exists, then determining the slice template satisfying the service characteristics as the target slice template; otherwise, generating the target slice template based upon the service characteristics, the preset slice template database, a preset virtual network function database, and a preset network function virtualization infrastructure database.

Optionally, in the embodiment of the disclosure, the device further includes:

a displaying module is configured, if the target slice template is deployed successfully, to display the state of a virtual network function of the target slice template to the user.

The device embodiment is substantially similar to the method embodiment, so the device has been described in brevity, and reference can be made to the description of the method embodiment for details of the device.

Based upon the same inventive idea, an embodiment of the disclosure further provides a computer device which can perform the flow of generating a network slice template according to the embodiment above.

Figure 6:
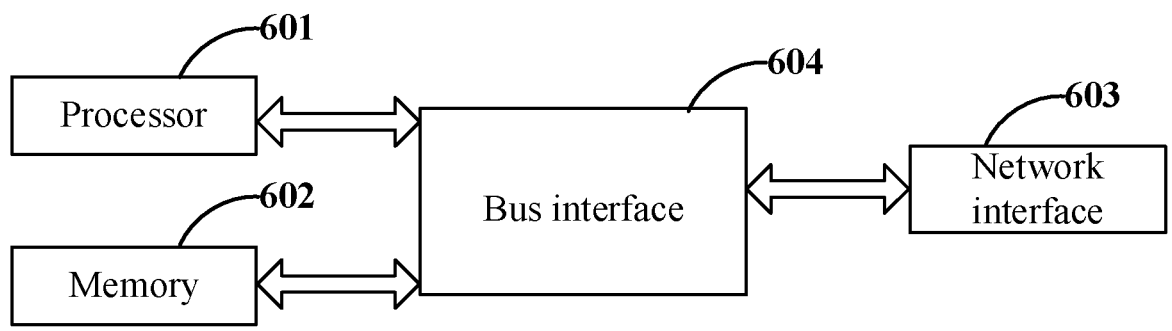
FIG. 6 and FIG. 7 are schematic structural diagrams respectively of computer devices according to embodiments of the disclosure.

FIG. 6 illustrates a schematic structural diagram of a computer device according to an embodiment of the disclosure, and as illustrated, the computer device can include a processor 601, a memory 602, a network interface 603, and a bus interface 604.

The processor 601 is responsible for managing the bus architecture and performing normal processes, and the memory 602 can store data for use by the processor 601 to perform operations. The network interface 603 is configured to transmit and receive data under the control of the processor 601.

The bus architecture can include any number of interconnecting buses and bridges to link together various circuits including one or more processors represented by the processor 601, and one or more memories represented by the memory 602. The bus architecture can further link together various other circuits, e.g., a peripheral device, a manostat, a power management circuit, etc., all of which are well known in the art, so a further description thereof will be omitted in this context. The bus interface 604 serves as an interface. The processor 601 is responsible for managing the bus architecture and performing normal processes, and the memory 602 can store data for use by the processor 601 while performing the operations.

The flow according to the embodiment of the disclosure can be applicable to the processor 601, or performed by the processor 601. In an implementation, the respective steps in the flow can be performed by integrated logic circuits in hardware, or instructions in software, in the processor 601. The processor 601 can be a general-purpose processor, a digital signal processor, an application specific integrated circuit, a field programmable gate array, or another programmable logic device, discrete gate, transistor logic device, or discrete hardware component. The respective methods, steps, and logic block diagrams disclosed in the embodiments of the disclosure can be implemented or performed. The general-purpose processor can be a micro processor, or can be any conventional processor, etc. The steps in the method according to the embodiment of the disclosure can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 602, and the processor 601 reads the information in the memory 602, and performs the steps in the flow with the hardware thereof.

Particularly, the processor 601 is configured to read and execute the program in the memory 602: to match in a preset slice template database according to a service characteristic requested by a user to find whether there is a slice template satisfying the service characteristic of a service requested by a user; if the slice template satisfying the service characteristics exists to determine the slice template satisfying the service characteristics as a target slice template; and otherwise, to generate a target slice template based upon the service characteristics, a preset slice template database, a preset virtual network function database, and a preset network function virtualization infrastructure database. Reference can be made to the embodiment above for a particular implementation of the flow above, so a repeated description thereof will be omitted here.

Based upon the same inventive idea, an embodiment of the disclosure further provides a computer device which can perform the flow of applying a network slice template according to the embodiment above.

Figure 7:
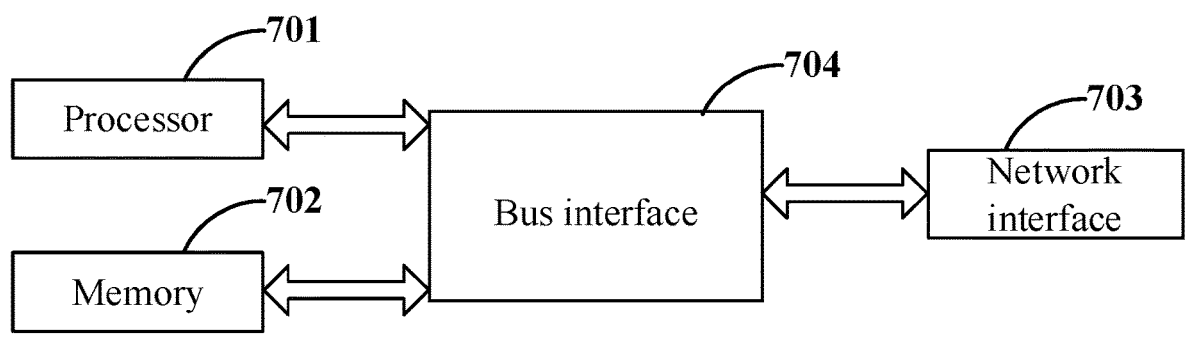

FIG. 7 illustrates a schematic structural diagram of a computer device according to an embodiment of the disclosure, and as illustrated, the computer device can include a processor 701, a memory 702, a network interface 703, and a bus interface 704.

The processor 701 is responsible for managing the bus architecture and performing normal processes, and the memory 702 can store data for use by the processor 701 to perform operations. The network interface 703 is configured to transmit and receive data under the control of the processor 701.

The bus architecture can include any number of interconnecting buses and bridges to link together various circuits including one or more processors represented by the processor 701, and one or more memories represented by the memory 702. The bus architecture can further link together various other circuits, e.g., a peripheral device, a manostat, a power management circuit, etc., all of which are well known in the art, so a further description thereof will be omitted in this context. The bus interface 604 serves as an interface. The processor 701 is responsible for managing the bus architecture and performing normal processes, and the memory 702 can store data for use by the processor 701 while performing the operations.

The flow according to the embodiment of the disclosure can be applicable to the processor 701, or performed by the processor 701. In an implementation, the respective steps in the flow can be performed by integrated logic circuits in hardware, or instructions in software, in the processor 701. The processor 701 can be a general-purpose processor, a digital signal processor, an application specific integrated circuit, a field programmable gate array, or another programmable logic device, discrete gate, transistor logic device, or discrete hardware component. The respective methods, steps, and logic block diagrams disclosed in the embodiments of the disclosure can be implemented or performed. The general-purpose processor can be a micro processor, or can be any conventional processor, etc. The steps in the method according to the embodiment of the disclosure can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 702, and the processor 701 reads the information in the memory 702, and performs the steps in the flow with the hardware thereof.

Particularly, the processor 701 is configured to read and execute the program in the memory 702: to load a target slice template satisfying service characteristics of a service requested by a user according to the service characteristics; to receive an instruction to deploy the target slice template; and to deploy the target slice template in response to the instruction, where the target slice template can be generated in the method according to the embodiment above. Reference can be made to the embodiment above for a particular implementation of the flow above, so a repeated description thereof will be omitted here.

Based upon the same inventive idea, an embodiment of the disclosure further provides a computer readable storage medium storing computer executable instructions configured to cause the computer to perform the flow of generating a network slice template according to the embodiment above.

Based upon the same inventive idea, an embodiment of the disclosure further provides a computer readable storage medium storing computer executable instructions configured to cause the computer to perform the flow of applying a network slice template according to the embodiment above.

The respective embodiments in the description have been described progressively, each of the embodiments has been focused on its differences from the other embodiments, and the description of their commonalities can be applied to each other.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device generate means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory generate an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to generate a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Lastly it shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise", and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a (n) . . . " will not exclude the presence of one or more additional identical element in the process, the method, the article or the device including the element.

The method and device for generating a network slice template, and the method and device for applying according to the embodiments of the disclosure have been described above in details, and the principle of the disclosure, and the implementations thereof have been set forth in particular examples, but the description of the embodiments above is only intended to facilitate understanding of the inventive methods and the core idea thereof; and those ordinarily skilled in the art can make variations to the particular implementations of the disclosure and their application scope without departing from the spirit of the disclosure. In summary, the claimed scope of the disclosure will not be limited to the disclosure of this specification.

What is claimed is:

1. A method for generating a network slice template, the method comprising:
    matching in a preset slice template database according to a service characteristic requested by a user to find whether there is a slice template satisfying the service characteristic;
    if there is a slice template satisfying the service characteristic requested by a user, determining the slice template satisfying the service characteristic as a target slice template; and
    otherwise, generating a target slice template based upon the service characteristic, a preset slice template database, a preset virtual network function database, and a preset network function virtualization infrastructure database by:
    matching in the preset virtual network function database according to the service characteristic to find whether there is a virtual network function satisfying with the service characteristic,
    if there is the virtual network function satisfying the service characteristic, generating the target slice template according to the virtual network function, and
    otherwise, matching in the slice template database to find whether there is an optimum slice template according to the service characteristic and the virtual network function database, and if there is the optimum slice template, generating the target slice template based upon the optimum slice template, otherwise generating a virtual network function satisfying the service characteristic, and generating the target slice template according to the virtual network function.

2. The method according to claim 1, wherein matching in a preset slice template database according to a service characteristic requested by a user to find whether there is a slice template satisfying the service characteristic comprises:

parsing slice templates in the slice template database to determine a characteristic of a virtual network function of each of the slice templates;

matching the characteristics of the virtual network functions of the slice templates with the service characteristic; and if a characteristic of the virtual network function of one of the slice templates match with the service characteristics, determining that there is a slice template satisfies the service characteristics.

3. The method according to claim 2, wherein the service characteristic, and the characteristic of the virtual network function respectively comprise a service type, a service capacity, a service interface and a quantity of connection, and a service high-availability cluster demand; and determining that the characteristics of the virtual network function of the slice template match with the service characteristic comprises:

matching the service type of the virtual network function with the service type included in the service characteristic, matching the service capacity of the virtual network function with the service capacity comprised in the service characteristic, matching a service interface and a quantity of connection of the virtual network function with a service interface and a quantity of connection comprised in the service characteristics, and matching the service high-availability cluster demand of the virtual network function with the service high-availability cluster demand comprised in the service characteristics; and determining that the characteristics of the virtual network function of the slice template match with the service characteristic when the service type of the virtual network function matches with the service type comprised in the service characteristic, the service capacity of the virtual network function matches with the service capacity comprised in the service characteristic, a service interface and a quantity of connection of the virtual network function match with a service interface and a quantity of connection comprised in the service characteristics, and the service high-availability cluster demand of the virtual network function matches with the service high-availability cluster demand comprised in the service characteristics.

4. The method according to claim 1, wherein the service characteristic, and the characteristic of the virtual network function respectively comprise a service type, a service capacity, a service interface and a quantity of connection, and a service high-availability cluster demand; and the matching in the preset virtual network function database according to the service characteristic to find whether there is a virtual network function satisfying the service characteristic comprises:

matching the service type of each of the virtual network functions in the preset virtual network function database with the service type comprised in the service characteristic, matching the service capacity of each of the virtual network functions in the preset virtual network function database with the service capacity comprised in the service characteristic, matching a service interface and a quantity of connection of each of the virtual network functions in the preset virtual network function database with a service interface and a quantity of connection comprised in the service characteristic, and matching the service high-availability cluster demand of each of the virtual network functions in the preset virtual network function database with the service high-availability cluster demand comprised in the service characteristic; and determining that the virtual network function satisfies the service characteristic when the service type of the virtual network function matches with the service type comprised in the service characteristic, the service capacity of the virtual network function matches with the service capacity comprised in the service characteristic, a service interface and a quantity of connection of the virtual network function match with a service interface and a quantity of connection comprised in the service characteristic, and the service high-availability cluster demand of the virtual network function matches with the service high-availability cluster demand comprised in the service characteristic.

5. The method according to claim 1, wherein the generating the target slice template based upon the optimum slice template comprises:

presenting the optimum slice template;

reminding the user of editing the optimum slice template;

receiving information about editing of the optimum slice template by the user; and generating the target slice template based upon the optimum slice template and the information about editing.

6. The method according to claim 4L wherein the generating the virtual network function satisfying the service characteristic comprises:

presenting network function virtualization infrastructures in the preset network function virtualization infrastructure database to the user;

reminding the user of selecting one of the network function virtualization infrastructures;

receiving a network function virtualization infrastructure selected by the user;

generating the virtual network function satisfying the service characteristic according to the network function virtualization infrastructure selected by the user; and storing generated virtual network function into the virtual network function database.

7. The method according to claim 6, further comprising:

reminding the user of extending an existed network function virtualization infrastructures for satisfying the service characteristic, or generating a network function virtualization infrastructure satisfying the service characteristic; and storing the extended or generated network function virtualization infrastructure into the preset network function virtualization infrastructure database.

8. A method for applying a network slice template, the method comprising:

loading a target slice template satisfying a service characteristic of a service requested by a user according to the service characteristic;

receiving an instruction for deploying the target slice template; and deploying the target slice template according to the instruction;

wherein the target slice template is generated by:

matching in a preset slice template database according to a service characteristic requested by a user to find whether there is a slice template satisfying the service characteristic;

if there is a slice template satisfying the service characteristic requested by a user, determining the slice template satisfying the service characteristic as a target slice template; and otherwise, generating a target slice template based upon the service characteristic, a preset slice template database, a preset virtual network function database, and a preset network function virtualization infrastructure database by:

matching in the preset virtual network function database according to the service characteristic to find whether there is a virtual network function satisfying with the service characteristic, if there is the virtual network function satisfying the service characteristic, generating the target slice template according to the virtual network function, and otherwise, matching in the slice template database to find whether there is an optimum slice template according to the service characteristic and the virtual network function database, and if there is the optimum slice template, generating the target slice template based upon the optimum slice template, otherwise, generating a virtual network function satisfying the service characteristic, and generating the target slice template according to the virtual network function.

9. The method according to claim 8, further comprising:

if the target slice template is deployed successfully, displaying a state of a virtual network function of the target slice template to the user.

10. A device for generating a network slice template, the device comprising:

a slice template matching module configured to match in a preset slice template database according to a service characteristic requested by a user to find whether there is a slice template satisfying the service characteristic;

a target slice template determining module configured to determine the slice template satisfying the service characteristic as a target slice template if there is a slice template satisfying the service characteristic requested by a user; and a target slice template generating module configured to generate a target slice template based upon the service characteristic, a preset slice template database, a preset virtual network function database, and a preset network function virtualization infrastructure database if there is no slice template satisfying the service characteristic, the target slice template generating module comprises:

a second characteristic matching sub-module configured to match in the preset virtual network function database according to the service characteristic to find whether there is a virtual network function satisfying the service characteristic, a first target slice template creating sub-module configured, if there is a virtual network function satisfying the service characteristic, to generate the target slice template according to the virtual network function, an optimum slice template matching sub-module configured, if there is no virtual network function satisfying the service characteristic, to match in the slice template database according to the service characteristic and the virtual network function database to find whether there is an optimum slice template, a second target slice template generating sub-module configured, if there is an optimum slice template, to generate the target slice template based upon the optimum slice template, and a virtual network function generating sub-module configured, if there is no optimum slice template, to generate a virtual network function satisfying the service characteristic, and to generate the target slice template according to the virtual network function.

11. The device according to claim 10, wherein the slice template matching module comprises:

a characteristic determining sub-module configured to parse slice templates in the slice template database to determine characteristics of virtual network functions of each of the slice templates;

a first characteristic matching sub-module configured to match the characteristics of the virtual network functions of each of the slice templates with the service characteristic; and a determining sub-module configured, if the characteristics of the virtual network function of one of the slice templates match with the service characteristic, to determine that there is a slice template satisfying the service characteristic.

12. The device according to claim 11, wherein the service characteristic, and the characteristic of the virtual network function respectively comprise a service type, a service capacity, a service interface and a quantity of connection, and a service high-availability cluster demand; and the first characteristic matching sub-module comprises:

a first characteristic matching unit configured to match the service type of the virtual network function with the service type comprised in the service characteristic, to match the service capacity of the virtual network function with the service capacity comprised in the service characteristic, to match a service interface and a quantity of connection of the virtual network function with a service interface and a quantity of connection comprised in the service characteristic, and to match the service high-availability cluster demand of the virtual network function with the service high-availability cluster demand comprised in the service characteristic; and a first characteristic match determining unit configured to determine that the characteristic of the virtual network function of the slice template match with the service characteristic when the service type of the virtual network function matches with the service type comprised in the service characteristic, the service capacity of the virtual network function matches with the service capacity comprised in the service characteristic, a service interface and a quantity of connection of the virtual network function match with a service interface and a quantity of connection comprised in the service characteristic, and the service high-availability cluster demand of the virtual network function matches with the service high-availability cluster demand comprised in the service characteristic.

13. The device according to claim 10, wherein the service characteristic, and the characteristic of the virtual network function respectively comprise a service type, a service capacity, a service interface and a quantity of connection, and a service high-availability cluster demand; and the second characteristic matching sub-module comprises:

a second characteristic matching unit is configured to match the service type of each virtual network function in the preset virtual network function database with the service type comprised in the service characteristic, to match the service capacity of the virtual network function in the preset virtual network function database with the service capacity comprised in the service characteristic, to match a service interface and a quantity of connection of the virtual network function in the preset virtual network function database with a service interface and a quantity of connection comprised in the service characteristic, and to match the service high-availability cluster demand of the virtual network function in the preset virtual network function database with the service high-availability cluster demand comprised in the service characteristic; and a determining unit configured to determine that the characteristic of the virtual network function match with the service characteristic when the service type of the virtual network function matches with the service type comprised in the service characteristic, the service capacity of the virtual network function matches with the service capacity comprised in the service characteristic, a service interface and a quantity of connection of the virtual network function match with a service interface and a quantity of connection comprised in the service characteristic, and the service high-availability cluster demand of the virtual network function matches with the service high-availability cluster demand comprised in the service characteristic.

14. The device according to claim 10, wherein the second target slice template generating sub-module comprises:
a first presenting unit configured to present the optimum slice template;
a first reminding unit configured to remind the user of editing the optimum slice template;
a first receiving unit configured to receive information about editing of the optimum slice template by the user; and
a first target slice template generating unit configured to generate the target slice template based upon the optimum slice template and the information about editing.

15. The device according to claim 10, wherein the virtual network function generating sub-module comprises:
a second presenting unit configured to present network function virtualization infrastructures in the preset network function virtualization infrastructure database to the user;
a first reminding unit configured to remind the user of selecting one of the network function virtualization infrastructures;
a first receiving unit configured to receive a network function virtualization infrastructure selected by the user;
a virtual network function generating unit configured to generate the virtual network function satisfying the service characteristic according to the network function virtualization infrastructure selected by the user; and
a virtual network function storing unit configured to store generated virtual network function into the virtual network function database.

16. The device according to claim 15, wherein the virtual network function generating sub-module further comprises:

a network function virtualization infrastructure generating unit configured to remind the user of extending an existed network function virtualization infrastructure for satisfying the service characteristic, or generating a network function virtualization infrastructure satisfying the service characteristic;
a network function virtualization infrastructure storing unit configured to store the extended or generated network function virtualization infrastructure into the preset network function virtualization infrastructure database.

17. A device for applying a network slice template, the device comprising:
a target slice template loading module configured to load a target slice template satisfying service characteristic of a service requested by a user according to the service characteristic;
an instruction receiving module configured to receive an instruction for deploying the target slice template; and
a deploying module configured to deploy the target slice template according to the instruction;
wherein the target slice template is generated by:
matching in a preset slice template database according to a service characteristic requested by a user to find whether there is a slice template satisfying the service characteristic;
if there is a slice template satisfying the service characteristic requested by a user, determining the slice template satisfying the service characteristic as a target slice template; and
otherwise, generating a target slice template based upon the service characteristic, a preset slice template database, a preset virtual network function database, and a preset network function virtualization infrastructure database, by:
matching in the preset virtual network function database according to the service characteristic to find whether there is a virtual network function satisfying with the service characteristic,
if there is the virtual network function satisfying the service characteristic, generating the target slice template according to the virtual network function, and
otherwise, matching in the slice template database to find whether there is an optimum slice template according to the service characteristic and the virtual network function database, and if there is the optimum slice template, generating the target slice template based upon the optimum slice template, otherwise, generating a virtual network function satisfying the service characteristic, and generating the target slice template according to the virtual network function.

18. The device according to claim 17, further comprises:
a displaying module configured, if the target slice template is deployed successfully, to display a state of a virtual network function of the target slice template to the user.

* * * * *